Feb. 12, 1935.  A. G. ENOCK  1,990,536
CAPSULING BOTTLE AND APPARATUS THEREFOR
Filed May 10, 1933    8 Sheets-Sheet 1

INVENTOR
A. G. Enock
BY Jowden O'Brien
ATTORNEY

Feb. 12, 1935. A. G. ENOCK 1,990,536
CAPSULING BOTTLE AND APPARATUS THEREFOR
Filed May 10, 1933 8 Sheets-Sheet 5

INVENTOR
A.G. Enock
BY
J. owden O'Brien
ATTORNEY

Feb. 12, 1935. A. G. ENOCK 1,990,536
CAPSULING BOTTLE AND APPARATUS THEREFOR
Filed May 10, 1933  8 Sheets-Sheet 8

Patented Feb. 12, 1935

1,990,536

UNITED STATES PATENT OFFICE 1,990,536

CAPSULING BOTTLE AND APPARATUS THEREFOR

Arthur Guy Enock, Wembley Park, England

Application May 10, 1933, Serial No. 670,325
In Great Britain May 25, 1932

11 Claims. (Cl. 226—83)

This invention relates to a method of capping or applying capsules to bottles more particularly to such as have a bead round the outer edge of the mouth, in which the cap piece to form the cap or capsule cut in sheet or disc form is fed into position over the bottle mouth, is partly formed thereon and finally shaped to in situ and secured around the bead of the bottle mouth.

Machines for capsuling or capping bottles with metal or metallic caps are well known in which the metal cap pieces are fed from a plain strip drawn from a reel of aluminium which is fed, punched, embossed and the caps drawn or pressed to shape by dies, deposited on the bottle mouths and crimped or clamped thereto. Considerable difficulties are experienced in the use of such machines in a dairy atmosphere due to the deterioration of the extremely sharp and delicately set dies and punches which are necessary to deal with aluminium foil and the risk of poor action of the feed rolls or breakage of the strip which cause delay in the bottling of milk when any trouble is experienced in these ways. It is found in practice with machines referred to above that in order to maintain the work of the feed rolls and dies at a supportably high state of efficiency it is necessary to use foil of .100 m/m in thickness or thereabouts to reduce the risk of stoppage. Such stoppage is most detrimental to the progress of work in bottling dairies where there is a continual stream of prepared milk passing through the dairy machinery which must be dealt with without interruption. A further difficulty in employing foils lighter than .100 m/m is that after drawing the cap to shape and then crimping or clamping it to the bottle it is liable to split where the metal is thinned and hardened by drawing by the dies in the region of the bottle lip and a leaky cap results. It would not be practicable to use .025 m/m foil in such a way but in my process this thickness or less may be used as the cap is moulded in situ over the bottle mouth without thinning the metal and a perfect though light cap results.

My object is to obviate these difficulties by excluding from the dairy the feed rolls and cutting dies and by using much cheaper foil of .05 m/m or less in thickness, in ready cut, embossed or partly formed cap-pieces or blanks, and to provide appliances to handle extremely light cap-pieces of foil and means for forming these pieces into caps over the bottle mouth itself and securing them thereto. I find that bottles may be securely capped in this way and that a filled bottle capped with extremely thin foil may be reversed and held upside down without leakage and with ample security for one delivery. My caps it is found are more easily removed from the bottles by the fingers without risk and parts of the cap are not left adhering to the bottle neck, causing labour in cleaning bottles as is the case with heavier caps.

According to the invention the apparatus comprises a tubular holder or magazine to contain a supply of cap pieces (in the form of discs or partly formed caps) a suction nozzle adapted to withdraw a cap piece from the magazine and transfer it to a position above the bottle mouth, a holder to receive the cap piece, a capping head fitted with movable ram or plunger against which the cap piece and the bottle mouth are pressed, a pleating or forming ring within the capping head, and means to support and raise the bottles (singly or in rows) into contact with the cap-piece and the ram or plunger in the capping head.

The invention may also comprise means for actuating or constructing a pleating or forming ring or die which folds down tabs on the cap pieces against the bottle neck, also means to apply an adhesive or moisture thereto.

The cap pieces or sheets of capsuling material may be of metal foil, plain or waxed paper, cellophane, celluloid or other suitable material flat or embossed and of any desired shape such as round, square or oval and with or without tabs.

The invention will be fully described with reference to the accompanying drawings:—

In the drawings the same reference letters are used to denote similar parts in all the figures.

The invention may be applied to machines for capping single bottles, to rotary machines for capping bottles successively or two or more bottles simultaneously or to machines in which a row of bottles in a crate may be capped at one operation.

In carrying out the invention a magazine $b$ is provided for containing a supply of blanks, cap-pieces, or partly formed caps from which cap pieces may be withdrawn one at a time at either top or bottom end without disturbing the next blank. The blanks are withdrawn from the magazine by a pneumatic suction nozzle $t^1$ of a form adapted to handle the cap-piece without distortion, but with sufficient deflection to bring it away from the next without disturbance. The suction nozzle $t^1$ transfers the blank cap-piece from the magazine $b$ to a position above the mouth of the bottle A and deposits it in a holder $u$ below a capping head $a$ or transfers it to another suction nozzle $t$ within the capping head $a$. The raising of the bottle A presses the cap-piece against a spring controlled movable ram or plunger $s$ and through a pleating or forming ring or die $gg$ which folds down the edges of the cap-piece against the bottle neck. The cap-piece is thus pressed to shape over the bottle mouth and is then moulded into the bead and round the bottle neck by the ring $q$ or wire $bg$, without thinning the metal.

The capping head $a$ is fitted internally with a sliding sleeve $p$ beneath which is a rubber ring $q$, and inside the sleeve $p$ against a spring $r$ is a sliding plunger $s$ carrying a vacuum suction nozzle $t$. A guide $u$ for the bottle mouth is fitted under the lower end of the capping head $a$ forming a recess between itself and the head wherein the cap-piece or blank B is supported. The bottle guide $u$ is formed with a gap or slot at one side through which the feeder arm $ag$ and suction nozzle $t^1$ enter in transferring the cap blank from the magazine $b$ into capping position above the bottle mouth.

The magazine $b$ is tubular and open at both ends with a support plate $az$ at the delivery end to retain the discs or cap-pieces therein but through which they can be readily withdrawn singly by a suction nobble $t^1$. The magazine $b$ may be open at the bottom and the cap-pieces B descend therein by gravity or it may be open at the top the cap pieces B being raised against the plate $az$ by a spring $bb$ (Figs. 6 and 8) the suction nozzle $t^1$ lifting them singly from the top. The magazine $b$ may be built up of a number of vertical strips $b^1$ (see Fig. 3).

The suction nozzle $t^1$ is connected by tube $tp$ with a vacuum chamber and is carried on an arm $ag$ and operated by crank or other mechanism to be alternately moved or traversed from the holder or magazine through the slot in the slotted plate or guide $u$ to deliver the cap piece below the capping head $a$.

The suction tubing is fitted with swivelling joints and control valves to open and shut off the vacuum.

A vertically reciprocating support or table for a bottle or bottles A of known form (not shown) is disposed below the capping head or heads $a$ and is raised by a cam or eccentric to bring the mouth of the bottle A into contact with the cap-piece against the capping head $a$.

Figure 1:
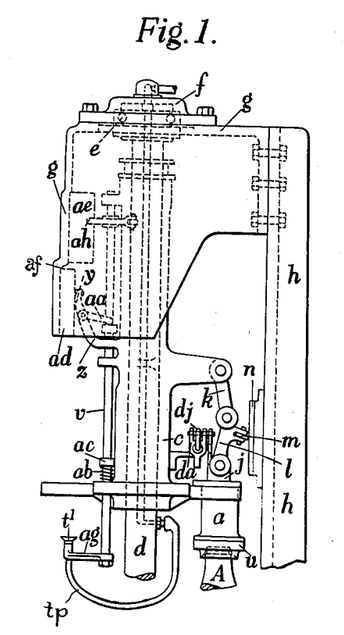
Fig. 1 is an elevation of capping head with magazine attached thereto as applied to a rotary machine.
Figure 2:
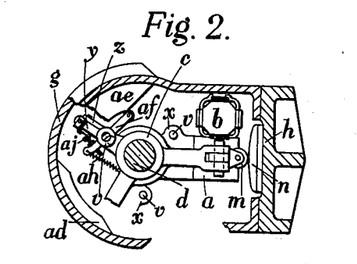
Fig. 2 is a plan of Fig. 1 showing operating cams and ramps.
Figure 3:
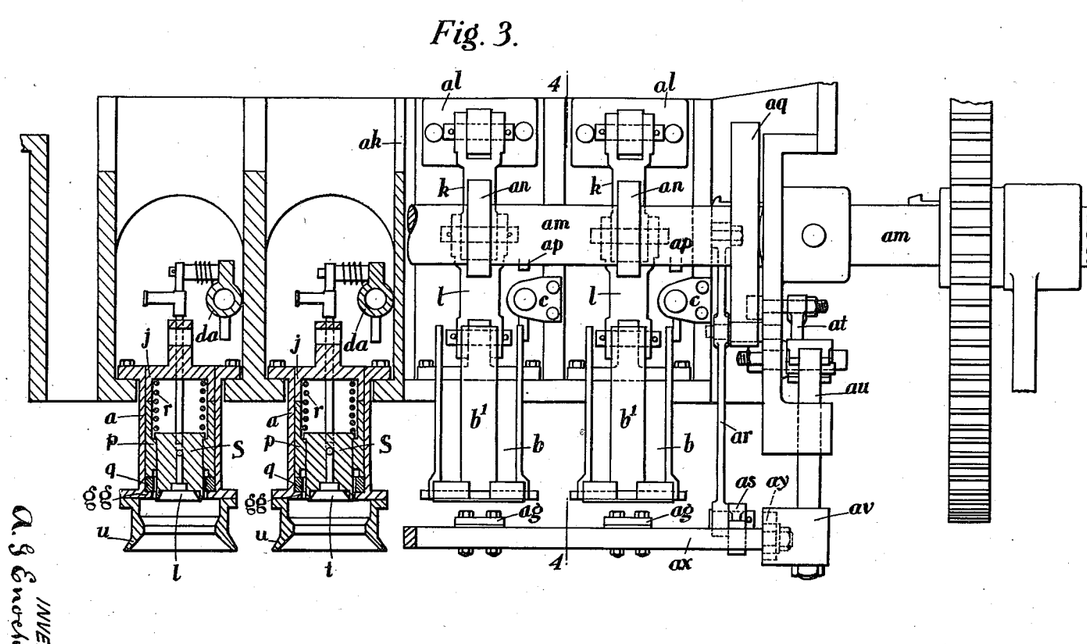
Fig. 3 is a sectional elevation of stationary capping heads with magazines attached thereto as applied to a machine for capping bottles in single rows in crates upon a table or conveyor.

In the form shown in Figs. 1 and 2 in which the invention is applied to a rotary capping machine, the capping head $a$ with magazines $b$ attached are mounted on a rotary central bracket $c$ which is adjustably mounted on the rotary central spindle $d$ with provision for vertical and turning movement thereon. The magazines $b$ may be in the form of a tube or built up from separate pieces $b^1$ as shown in Fig. 3. Cap blanks B in the magazine rest upon a support plate $az$ shown in detail, in Figs. 15 and 16. The lower end of the spindle $d$ is fitted to the rotary table or portion (not shown) of a known type of filling and discing or capping machine, while its upper end is carried in a bearing $e$ in the fixed casing $f$. In one form of structure the casing $f$ is attached to a shroud $g$ which in turn is fixed to a stationary vertical column $h$. Stationary ramps $ad$ and $ae$ are mounted within the shroud $g$ and between the central bracket $c$ and the sliding yoke $j$, toggle levers $k$ and $l$ are pivoted, the lever $l$ carrying a roller $m$ which contacts during a portion of the revolution of the bracket $c$ with the stationary ramp $n$ on the vertical column $h$.

A rod $v$ free to reciprocate and rotate, is carried in lugs $x$ of the central bracket $c$, which also carries a bell crank $y$ mounted in lugs $z$. The bell crank $y$ contacts with collar $aa$ mounted on the rod $v$ which is held against it by the action of a spring $ab$ against a collar $ac$. The rod $v$ also carries a lever $af$ and a feeding arm $ag$ on which is mounted the suction nozzle $t^1$. A return spring $ah$ is attached to the end of the lever $af$ which also carries adjusting screw $aj$. Vacuum controls are mounted on the bracket $c$ and will be described later with reference to Figs. 17 and 18.

Figure 4:
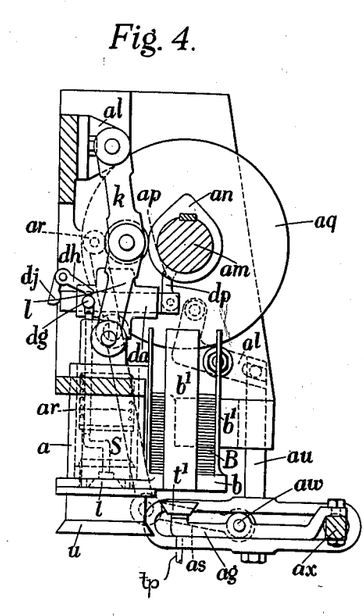
Fig. 4 is a sectional elevation on line 4—4 Fig. 3.
Figure 4A:
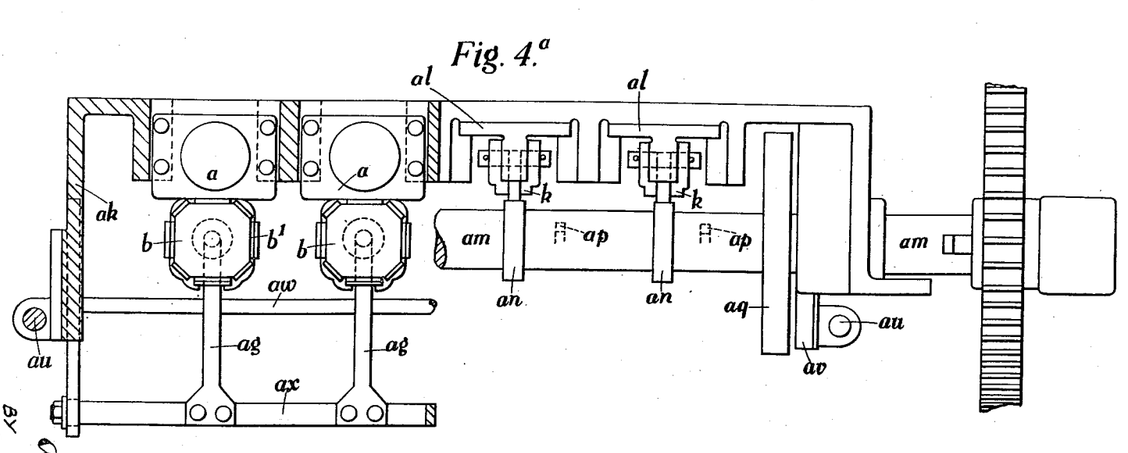
Fig. 4a is a plan of Fig. 3.
Figures 5, 13, 14, 19, 19A:
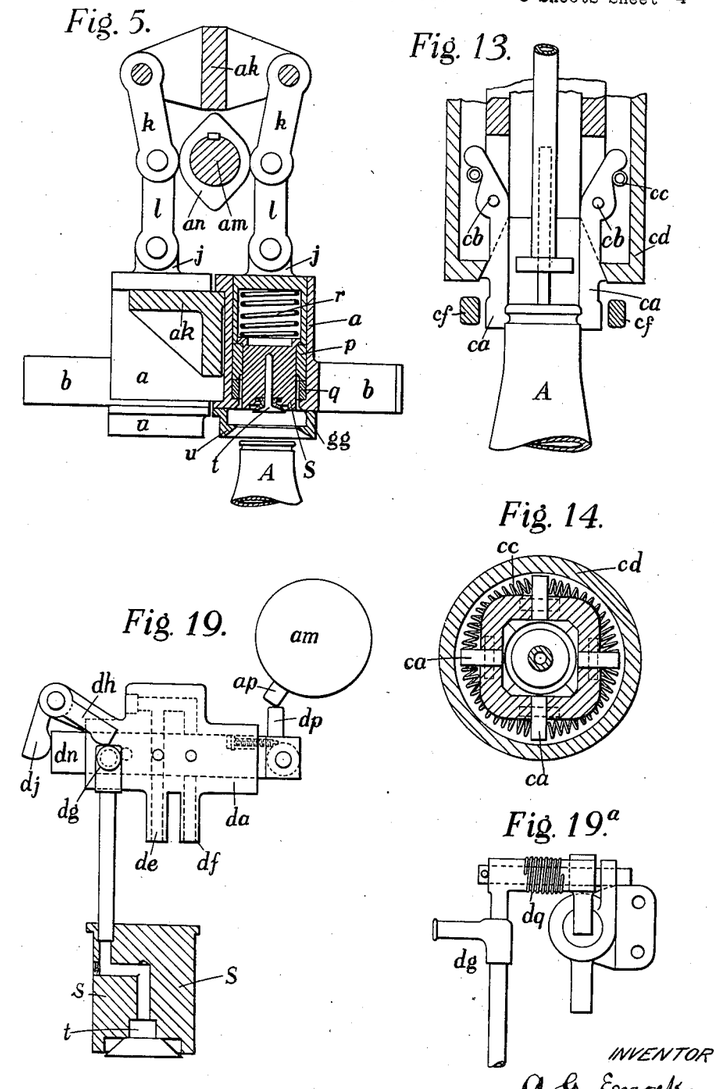
Fig. 5 is a sectional elevation of capping heads as in Fig. 3 arranged for capping two rows of bottles at a time.
Fig. 13 is a sectional elevation of head for another method of pressing cap to bottle.
Fig. 14 is a plan of Fig. 13.
Fig. 19 is a sectional elevation of modification of form shown in Fig. 17 with positive movement of valve.
Fig. 19a is a side elevation of Fig. 19.

In the form shown in Figs. 3 to 5 in which the invention is applied to a machine by which a row of bottles in a crate may be simultaneously capped; the capping heads $a$ are fitted in a main stationary frame $ak$ to which are pivoted upper members $k$ of toggle levers $k$ and $l$ by brackets $a^1$. Rotatably mounted in frame $ak$ is a shaft $am$ carrying arms $an$ and pegs $ap$ (Fig. 19). Similarly mounted on shaft $am$ are two grooved cams $aq$ which actuate lever $ar$ and link $as$ from one face and from the other face bell crank $at$ spindle $au$ and feeder guide $av$. Two spindles $aw$ and $ax$ with rollers $ay$ are supported in guides $av$, the spindle $aw$ being attached to links $as$. Supported by these spindles are feeder arms $ag$ carrying suction nozzles $t^1$. Mounted on the frame $ak$ are vacuum controls which will be described later with reference to Fig. 19.

Figure 6:
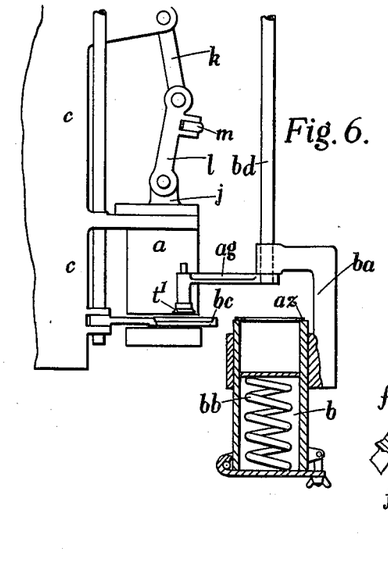
Fig. 6 is an elevation of rotating capping head showing method of feeding from a fixed stationary magazine.
Figure 7:
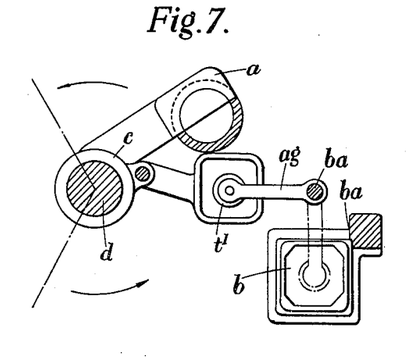
Fig. 7 is a plan of Fig. 6.

In a modification shown in Figs. 6 and 7 the capping head $a$ is mounted in the adjustable rotating bracket $c$ as in Figs. 1-2 but the magazine $b$ is carried in a separate fixed bracket $ba$. The blanks are held against the support plate $az$ by the spring $bb$. A feed arm $ag$ carrying the suction nozzle $t^1$ is mounted in the bracket $ba$, by means of the reciprocally moving suction tube $bd$.

Figures 8, 9:
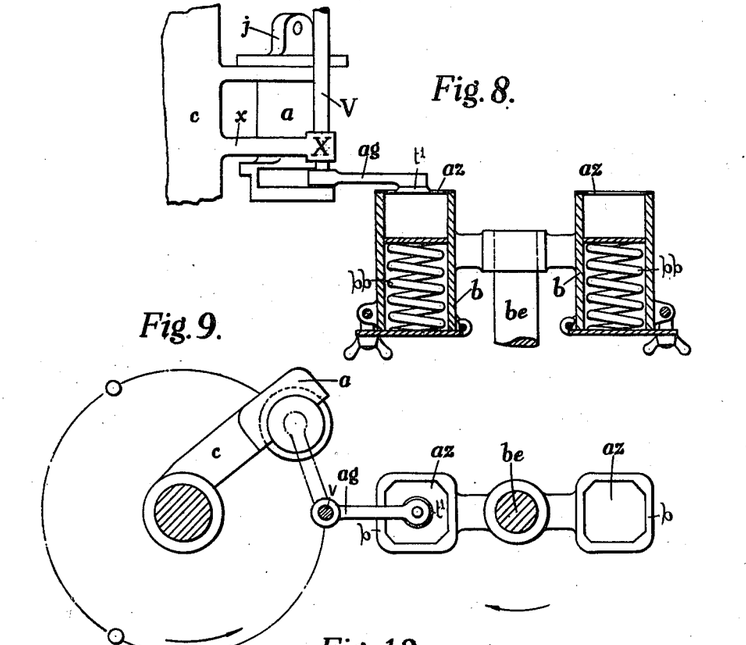
Fig. 8 is an elevation of rotating capping head showing method of feeding from independently rotating or reciprocating magazines.
Fig. 9 is a plan of Fig. 8.

In further modification in Figs. 8 and 9 the capping head $a$ is mounted as before described with a reciprocating feeder arm $ag$ and suction nozzle $t^1$ mounted on a rod $v$ in lugs $x$ of a central bracket $c$. A spindle $be$ synchronously moving with the bracket $c$ carries one or more magazines $b$ which may be positioned to feed upward or downward.

Figure 10:
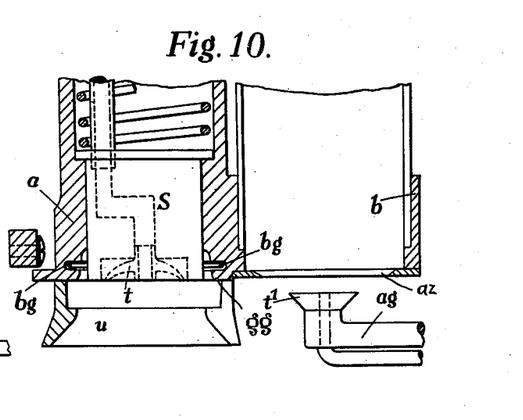
Fig. 10 is a sectional elevation of modified head showing another method of fixing cap to bottle.
Figure 11:
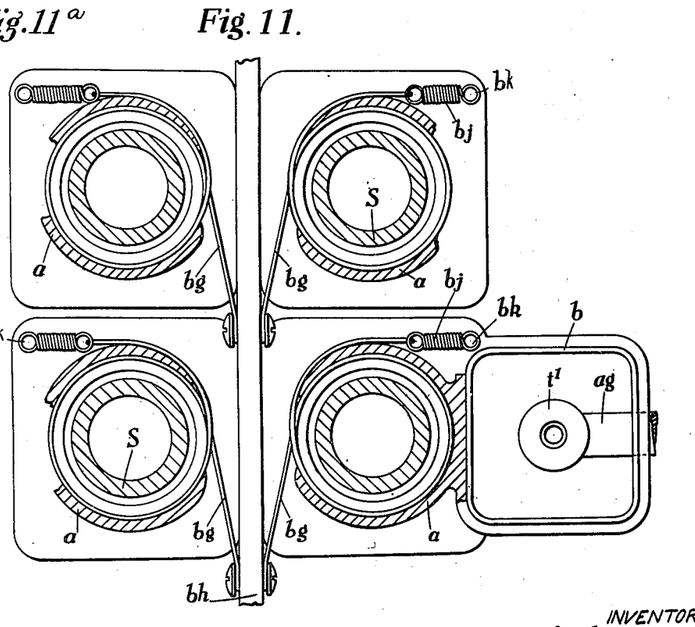
Fig. 11 is a plan of Fig. 10.
Figure 11A:
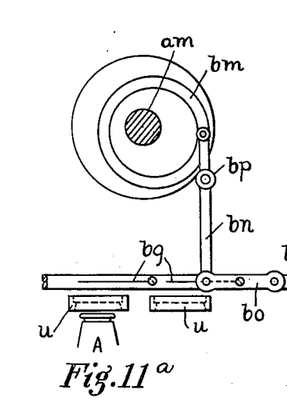
Fig. 11a is a side elevation on a reduced scale of the mechanism for giving a reciprocating motion to the bar b.

Figs. 10, 11 and 11a show a modified form for fixing caps to the bottles by a flexible crimping tube, wire or band $bg$ contained in a groove in the head $a$ attached at one end to a reciprocating bar $bh$ and at the other end through springs $bj$ to fixed points $bk$. The bar $bh$ is reciprocated by a cam $bm$ mounted on the shaft $am$ through a lever $bn$, pivoted at $bp$, and a link $bo$. For certain classes of caps the tube wire or band may be heated by steam, electric current or other means.

Figures 12, 24, 25:
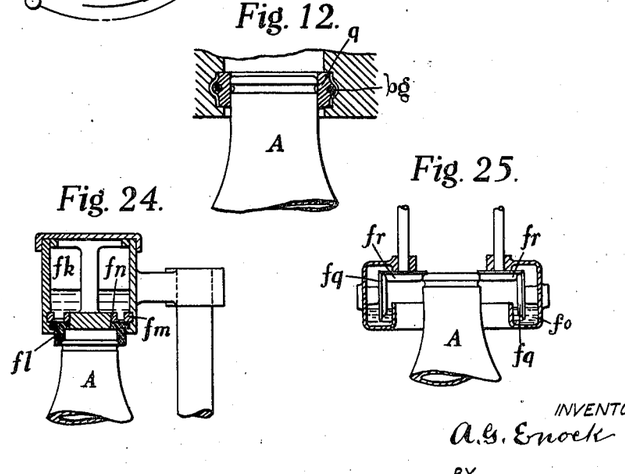
Fig. 12 is a modification of Figs. 10 and 11.
Fig. 24 is a section elevation alternative method of gumming or moistening sideways applicable to all types of machines.
Fig. 25 is a modification of Fig. 24 for gumming etc. from above.

The crimping wire $bg$ may be placed behind a flexible or compressible crimping ring $q$ as shown in Fig. 12.

Figs. 13 and 14 show another method of pressing the cap to the bottle neck by means of segmental members $ca$ suspended by pins $cb$ and held apart for the entry of the bottle by flat or coil springs $cc$. The members $ca$ are pressed inward round the bottle by the wedge like action of the tapered ring or collar $cd$.

The members $ca$ may be heated for certain classes of caps by an internal heating element or an external heating element $cf$.

Figure 15:
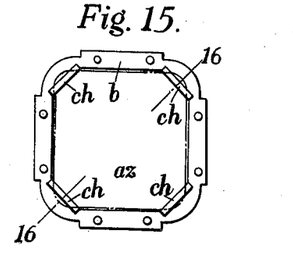
Fig. 15 is a plan of support plate for caps or blanks.
Figure 16:
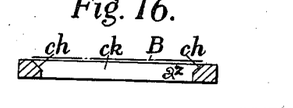
Fig. 16 is a section on line 16 of Fig. 15.

Figs. 15 and 16 show plan of magazine $b$ and support plates $az$ for the cap-pieces B, (Fig. 26) the plate being formed with chamfered or rounded edges $ch$ and aperture $ck$ through which the cap-pieces B are drawn by the suction nozzle $t^1$.

Figure 17:
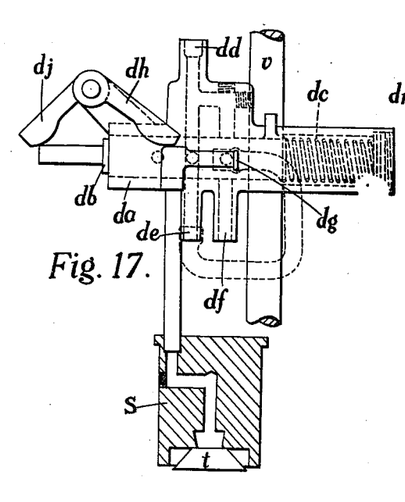
Fig. 17 is a sectional elevation of vacuum control cylinder, valve and trip motion with spring controlled return of valve as applicable to all types of machines.
Figure 18:
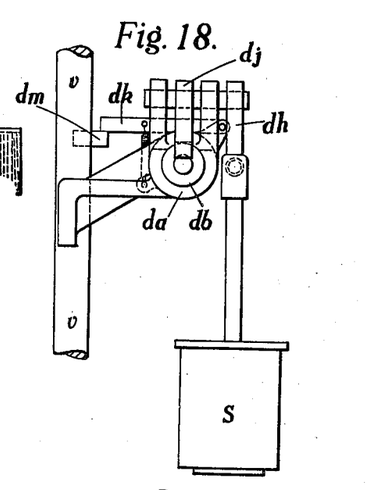
Fig. 18 is a side elevation of Fig. 17.
Figures 18A, 26, 27:
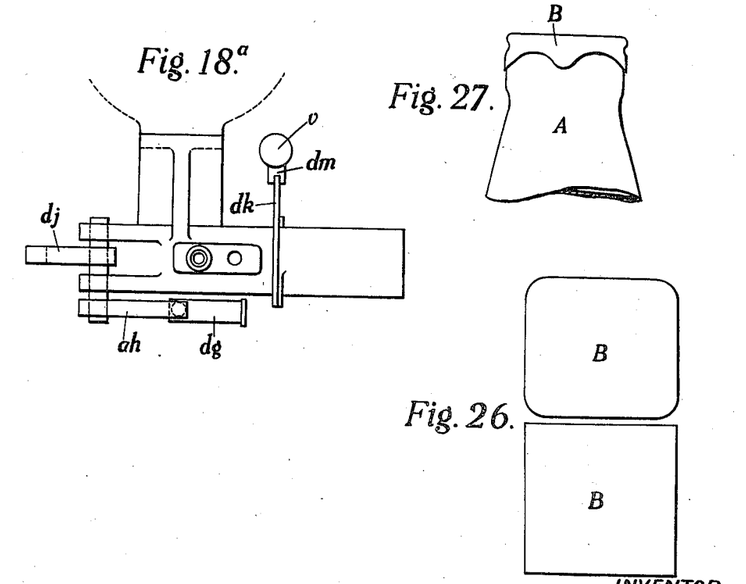
Fig. 18a is a plan of Fig. 17.
Fig. 26 is a plan of two forms of cap pieces.
Fig. 27 is a side elevation of bottle with cap in position.

Figs. 17 and 18, 18a show details of vacuum control for the suction nozzle $t$ in the capping head plunger $s$. A cylinder body $da$ containing a piston valve $db$ with spring return $dc$ is connected at $dd$ to a vacuum line. The cylinder body is formed with branches $de$ and $df$ connected by flexible tubing to the connection $dg$ (one being shown) to the suction nozzles $t$ and $t^1$. The links $dh$ and $dj$ are pivotally mounted so as to transform the vertical movement of the plunger $s$ and its vacuum connection $dg$ into a horizontal movement of the valve $db$. A lever $dk$ is mounted over the cylinder and drawn downward by the tension spring $dl$ and enters through the cylinder wall into a slot in the valve $db$. The rod $v$ has a pin $dm$ which contacts with and raises the lever $dk$ during a portion of the movement of the rod $v$.

Figs. 19 and 19a show another construction of vacuum control valves. A positively moved valve $dn$ is actuated in one direction by the plunger $s$ and its connection $dg$ and in the other direction by the peg $ap$ of the cam shaft $am$ coming into contact with the peg $dp$ fixed in the valve $dn$. The two levers $dh$ and $dj$ are held together by the spring $dq$ so that if a bottle should jam in the capping head $a$ and thus keep the vacuum connection $dg$ in its raised position while the valve $dn$ is being returned by the peg $ap$, the levers $dj$ and $dh$ are able to separate.

Figure 20:
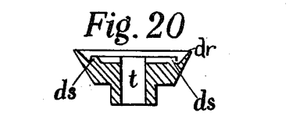
Fig. 20 is a sectional elevation of suction nozzle t.
Figure 21:
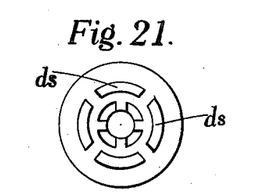
Fig. 21 is a plan of suction nozzle t.

Figs. 20 and 21 show a form of suction nozzle $t$ at present preferred for a light cap piece where the vacuum is sealed by an inclined flexible lip $dr$ and when the blank is held in position by the suction it is drawn downward until it is approximately level with the projecting ribs $ds$ which prevent buckling of the blank and hold it flat.

Figure 22:
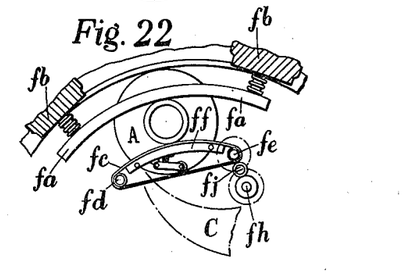
Fig. 22 is a plan of moistening or gumming appliance applicable to rotary machines.
Figure 23:
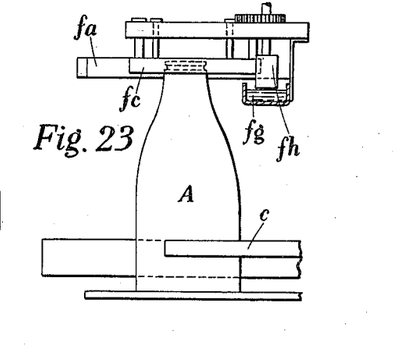
Fig. 23 is an elevation of same.

Figs. 22 and 23 show an appliance to be applied to a rotary machine for gumming or damping the bottle while it is moving forward. The bottle A is traversed with the neck against a guide $fa$ which is flexibly mounted on the frame work $fb$ of the machine, it is kept in contact with the guide $fb$ by a gumming or damping band $fc$ which revolves round the driven rollers $fd$ and $fe$. The band $fc$ is kept taut against the bottle A and maintains its curved form by passing over the curved surface of a guide $ff$ which is flexibly mounted to accommodate bottles of varying sizes. Gum or moisture is provided from a trough $fg$ into which dips a reciprocating and revolving roller $fh$ which transmits gum to the roller $fj$ which in turn transmits it to the band $fc$. The figures show the bottle traversing a curved path by the star wheel C but this may be straight when required by the construction of the capping machine.

Fig. 24 shows a gumming or damping appliance for gumming the bottle from above consisting of a reservoir $fk$ with its bottom sealed by an absorbent pad $fl$ kept in place by rings $fm$ and $fn$. The gum may be applied to the bottle A by raising and lowering either the reservoir or the bottle.

Fig. 25 shows an apparatus for gumming stationary bottles and consists of an annular reservoir $fo$ in which revolve wheels $fq$ which pick up gum and transfer it to revolving wheels $fr$ which in turn contact with and revolve the bottle spreading the gum around it.

In operation a cap-piece B is drawn from the magazine $b$ by the suction nozzle $t^1$ on the arm $ag$. The arm is depressed by the ram $ad$ and bell crank lever $y$ (Fig. 1) or by the cam $aq$ and bell crank lever $at$ (Figs. 1 to 3). The arm $ag$ and nozzle $t^1$ are then moved horizontally and transfer the cap-piece B through a gap or slot in the bottle guide $u$ under the plunger $s$ of the capping head $a$. The transfer motion to and fro of the suction nozzle $t^1$ is effected by the ramp $ae$, lever $af$ and spring $ah$ (Figs. 1 and 2) or by the profile cam $aq$ and levers $ar$ and $as$ (Figs. 3 to 5). The suction nozzle $t^1$ is raised by similar mechanism to place the cap-piece upon the suction nozzle $t$ and the vacuum cut off from the nozzle $t^1$ and opened to the nozzle $t$ which retains the cap-piece in position until the bottle mouth is raised into contact with it and the plunger s. The bottle A is raised through the guide u the bottle mouth pressing the cap blank firmly against the plunger s.

As the bottle rises further through the folding die gg and into the rubber ring q, the rubber ring q is compressed by the sleeve p which is depressed by the action of the ramp n or the cam an moving back the roller m in the link l and thus pushing down the yoke j and sleeve p. After the pressure on the rubber ring is released the bottle descends and a fresh cap-piece is fed in a similar manner.

On the compression of the rubber ring q by the sleeve p the rubber is forced into the recess below the bottle lip carrying with it the edges of the cap blank which are thereby pleated therein. Or the edges of the cap blank are pressed into the recess below the bottle lip by the tightening of the wire bg whereby crimps are formed therein.

As the bottle A rises it raises the plunger s and the suction connection dg which moves the valve db through levers dh and dj until the lever dk falls into a slot in the suction valve and prevents its return when the bottle descends. While the valve is in this position the connection dj which is connected to the weeder arm ag is in communication with the suction line through the connection dd and the feeder arm removes a blank from the magazine and transfers it to the capping position. As the feeder arm ag which is attached to the rod v rises to place the cap blank on the sucker t in the plunger the peg dm on the rod v raises the lever dk and the valve is returned by the spring dc to its outermost position when the suction line through dd is connected by means of de and dg to the suction nozzle t. Thus the suction required to feed a fresh cap only comes into operation when the plunger s is raised by the bottle and a cap piece is not fed when a bottle A is absent.

In Fig. 19 the suction valve is returned by the peg ap on the cam shaft instead of by a spring.

In Figs. 6 and 7 the feeder arm ag and suction nozzle t¹ place the blank in the intermediate blank holder bc which partially rotates and holds the cap-piece B in capping position and the further operations are as previously described.

In Figs. 10 and 11 when the cap piece B is folded over the top of the bottle the wire bg is drawn by the rod bh and crimps the cap into the bead of the bottle mouth.

When using capping material which requires wetting or gumming the bottle rotates along the surfaces shown in Figs. 22 and 23, and then passes to the capping head, while in Fig. 24 the bottle presses against the gumming pad and in Fig. 25 is rotated by the rollers fr and then passes to the capping head.

What I claim as my invention and desire to protect by Letters Patent is:—

1. In apparatus for capping bottles with cap pieces of thin material the combination with a tubular magazine for holding the cap pieces, of a suction nozzle adapted to withdraw a piece from the magazine and transfer it to a capping position, a transferring arm to carry the suction nozzle, a gapped guide to receive the cap piece, a capping head fitted with a movable spring controlled plunger against which the cap piece and the bottle mouth are pressed, a crimping and forming ring carried by the capping head to fold the edges of the cap piece and mould them around the bottle neck and means to connect the suction nozzle with a vacuum or suction chamber.

2. In apparatus for capping bottles with cap pieces of thin material the combination with a tubular magazine for holding the cap pieces, of a suction nozzle adapted to withdraw a piece from the magazine and transfer it to a capping position, a transferring arm to carry the suction nozzle, a gapped guide to receive the cap piece, a capping head fitted with a movable spring controlled ram provided with suction passages and a suction nozzle against which the cap piece and the bottle mouth are pressed, a pleating and forming ring carried by the capping head to fold the edges of the cap piece and mould them around the bottle neck and means to connect said suction nozzles with a vacuum or suction chamber.

3. Apparatus as in claim 1 and having a suction nozzle within the spring controlled plunger by which the cap-piece is held in position until engaged by the bottle mouth and compressed and folded round the bottle neck by the upward movement of the bottle.

4. Apparatus as in claim 1 and having a sliding sleeve and die working in conjunction with the forming ring within the capping head above a bottle guide to mould or crimp the edges of the cap piece around the bottle neck.

5. Apparatus as in claim 1 and having a tightening means by which the edges of the cap piece are crimped or pressed around and to the shape of the bottle neck.

6. Apparatus as in claim 1 and having a tightening wire by which the edges of the cap piece are crimped or pressed around and to the shape of the bottle neck.

7. Apparatus as in claim 1 and having a rubber resilient forming ring within the capping head and a tightening wire to compress the forming ring and press the edges round and to the shape of the bottle neck and means to tighten the wire.

8. Apparatus as in claim 1 and having a suction valve by which the suction is automatically cut off and on as the arm and nozzle are moved from one position to another.

9. Apparatus as in claim 1 and having a suction nozzle on the capping head and a vacuum valve to control the suction at the nozzle and hold the cap piece above the bottle mouth during the capping operation.

10. Apparatus as in claim 1 and having means for dampening the bottle necks preparatory to applying the cap pieces thereto.

11. Apparatus as in claim 1 and having a second suction nozzle and a flexible lip and supporting projections thereon for maintaining the cap piece flat.

ARTHUR GUY ENOCK.